United States Patent [19]

Muhr

[11] Patent Number: 5,414,706
[45] Date of Patent: May 9, 1995

[54] MULTI-STAGE SWITCHING EQUIPMENT

[75] Inventor: Johann Muhr, Munich, Germany

[73] Assignee: Siemens Aktiengesellschaft, Munich, Germany

[21] Appl. No.: 127,448

[22] Filed: Sep. 27, 1993

Related U.S. Application Data

[63] Continuation of Ser. No. 516,732, Apr. 30, 1990, abandoned.

[30] Foreign Application Priority Data

May 12, 1989 [DE] Germany ............... 8905982 U

[51] Int. Cl.$^6$ .................................... H04Q 11/04
[52] U.S. Cl. ........................ 370/65.5; 340/825.79
[58] Field of Search .................. 370/65.5, 64, 58.1,
370/60.1, 60, 94.1; 340/825.79, 825.8

[56] References Cited

U.S. PATENT DOCUMENTS

| | | | |
|---|---|---|---|
| 4,355,384 | 10/1982 | Genter et al. | 370/64 |
| 4,417,245 | 11/1983 | Melas et al. | 370/64 |
| 4,425,640 | 1/1984 | Philip et al. | 370/65.5 |
| 4,456,987 | 6/1984 | Wirsing | 370/65.5 |
| 4,754,451 | 6/1988 | Eng et al. | 370/60 |
| 4,837,761 | 6/1989 | Isono et al. | 370/60 |
| 4,879,712 | 11/1989 | Littlewood | 370/60 |
| 4,907,220 | 3/1990 | Rau et al. | 370/94.1 |
| 4,955,016 | 9/1990 | Eng et al. | 370/94.1 |
| 4,991,168 | 2/1991 | Richards | 370/65.5 |
| 4,993,018 | 2/1991 | Hajikano et al. | 370/60 |

FOREIGN PATENT DOCUMENTS

| | | | |
|---|---|---|---|
| 0171231 | 2/1986 | European Pat. Off. | H04Q 3/68 |
| 3640849 | 6/1988 | Germany . | |
| 1-58197A | 3/1989 | Japan | H04Q 3/64 |
| 1-61194A | 3/1989 | Japan | H04Q 3/52 |
| 2202712 | 9/1988 | United Kingdom | H04Q 11/04 |

OTHER PUBLICATIONS

Benés V. E., "Heuristic Remarks . . . Connecting Systems," B.S.T.J. Jul. 1962, pp. 1201–1247.
Jajszcyk A., "Design of Switching . . . Time–Spaced Elements", Advanced Information Soc., 1985, pp. 1061–1068.
Clos, "A Study of Non–Blocking Switching Networks," B.S.T.J. No. 32, 1953, pp. 406–424.
Gerke, "Neve Kommunikationsnetze," Springer–Verlag, Berlin, Heidelberg, New York, 1982, pp. 50–51.

*Primary Examiner*—Douglas W. Olms
*Assistant Examiner*—Dang Ton
*Attorney, Agent, or Firm*—Hill, Steadman & Simpson

[57] ABSTRACT

Multi-stage switching equipment comprises a plurality of n/2n space-division couplers in a first switching matrix stage, "m" x/x space-division couplers combined into a switching matrix in a middle switching matrix stage, and a plurality of 2n/n space-division couplers in a third switching matrix stage and canonically connected intermediate lines between the switching matrix stages are replaced by connecting cables that respectively connect interface output ports of the first switching matrix stage to coupler input ports and coupler output ports to interface input ports of the third switching matrix stage.

8 Claims, 1 Drawing Sheet

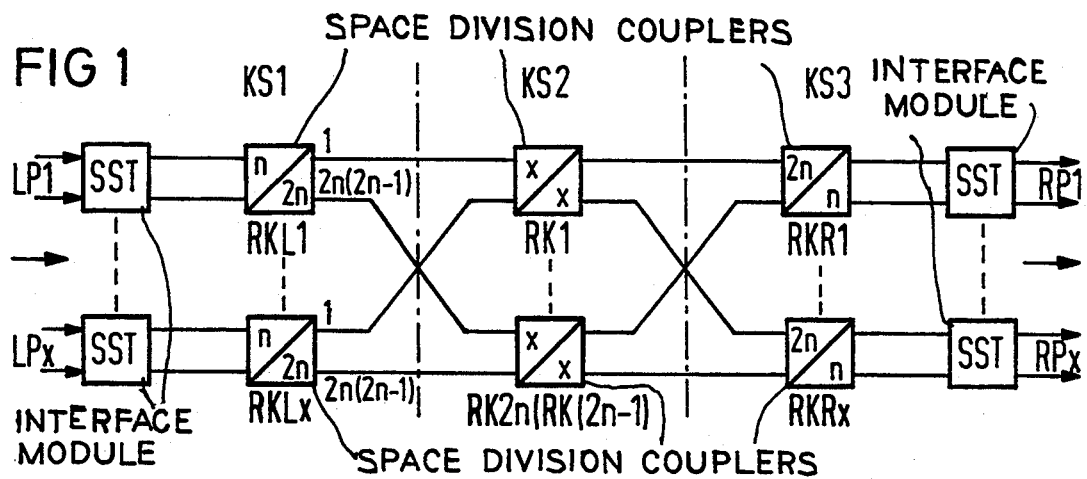
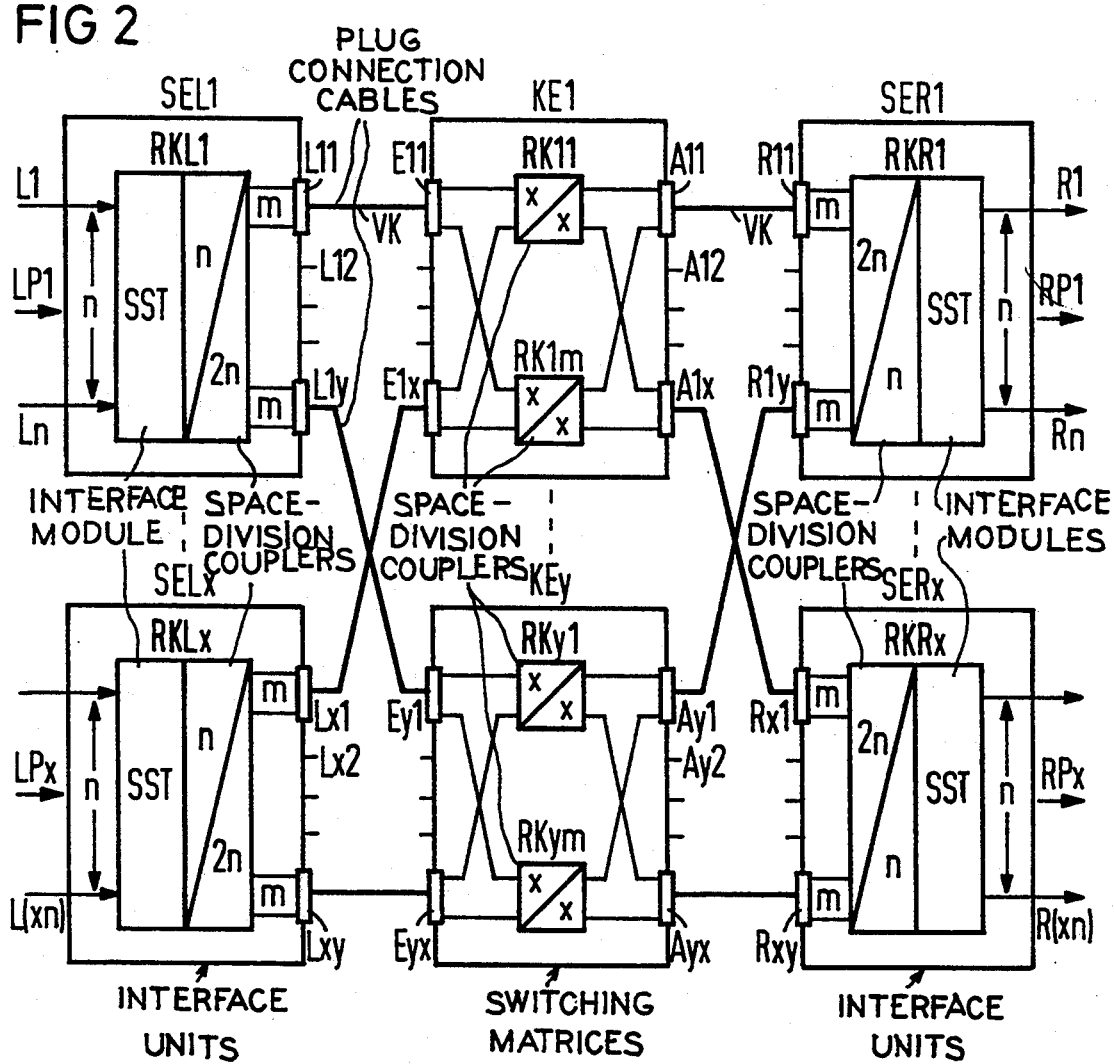

MULTI-STAGE SWITCHING EQUIPMENT

This is a continuation of application Ser. No. 07/516,732, filed Apr. 30, 1990, now abandoned.

BACKGROUND OF THE INVENTION

1. Field of the Invention

The present invention relates to a multi-stage switching equipment for blocking-free connection of nx input lines to nx output lines, comprising a first switching matrix network stage that includes n/2n space-division couplers, a middle switching stage that comprises x/x space-division couplers, whereby respectively one output of an n/2n space-division coupler is connected by an intermediate line to an input of a x/x space-division coupler, and comprising a third switching matrix network stage that comprises 2n/n space-division couplers, and in which a respective output of an x/x space-division coupler is connected by an intermediate line to an input of a 2n/n space-division coupler.

2. Description of the Prior Art

The primary task of switching technology is to couple inputs to outputs. In channel switching or circuit switching, the connection of inputs to outputs occurs with a switching equipment that is controlled by a switching computer. Both electro-mechanical components and electronic switches to an increasing degree are employed as contacts. Dependent on the construction of the switching equipment, signals can be transmitted via the same crosspoints in one or both directions. In addition to the standard space-division multiplex operation of switching equipment, it is also possible to realize switching equipment according to the time-division multiplex (TDM) principle or to combine the two principles.

Switching equipment are usually constructed of uniform, basic modules based on defined principles. The multi-stage Clos switching matrix network has proven particularly advantageous, this being described in the book "Neue Kommunikationsnetze" by Peter R. Gerke, Springer Verlag, 1982, in the Chapter Koppeleinrichtungen, pp. 50–51, and that is discussed in detail in the article by Clos in the Bell System Technical Journal, Vol. 32, 1953, pp. 406–424. The Clos switching matrix network contains three switching matrix network stages, whereby the couplers of the outer stages make it possible to through-connect each of the lines to a double plurality of intermediate lines (more precisely, one fewer than the double plurality) that are connected to couplers of the middle stage. A respective intermediate line extends between each of the couplers of the outer stage and of the middle stage. In larger switching equipment, however, this type of wiring results in an expense that can hardly be justified.

SUMMARY OF THE INVENTION

It is an object of the present invention to provide a switching matrix network that enables a more simple wiring between the stages of the switching matrix network.

Furthermore, the switching equipment should be expandable.

The above object is achieved in a switching system of the type initially set forth which is particularly characterized in that respectively m outputs of an n/2n space-division coupler are combined to form an interface output port, that respectively m x/x space-division couplers are combined to form a switching matrix, that a respective input of the x/x space-division couplers of a switching matrix is conducted to a coupler input port, that a respective interface output port of an n/2n space-division coupler is respectively connected to a coupler input port of each switching matrix, that a respective output of each x/x space-division coupler of a switching matrix is connected to a coupler output port, that respectively m inputs of each 2n/n space-division coupler are combined to form interface input ports, and that a respective coupler output port of each switching matrix is respectively connected to an interface input port of each 2n/n space-division coupler.

The particular advantage of the present invention lies in the surveyable structure of the switching matrix network. All of the switching matrices are identically constructed. Bus lines or cables that connect the switching matrices to one another can now be employed instead of individual intermediate lines. The plurality of connections is thereby considerably reduced corresponding to the plurality of lines per bus or cable. The wiring is significantly simplified with pluggable connecting cables. The connecting cables, of course, can be provided with coded plugs that facilitate the wiring and make an incorrect wiring impossible. Fundamentally, of course, a printed wiring between the switching matrices is also possible. This is considerably facilitated by the parallel lines of a corresponding printed connecting cable.

It is advantageous when an n/2n space-division coupler or, respectively, 2n/n space-division coupler is combined to form an interface unit together with an electrical interface that can also contain equipment for time-division multiplex operation in addition to containing a circuit for the adaptation between the signals on the central office lines and those of the space-division couplers. The wiring between the interface assembly and the n/2n space-division coupler is thereby eliminated.

It is particularly advantageous that an interruption-free expansion of the switching equipment is possible. This can occur on the basis of further interface units when the switching equipment were pre-equipped for the ultimate expansion. The switching equipment can also be expanded by a potentially multiple squaring and can be augmented by the corresponding interface units.

The employment of switching matrices that contain eight x/x space-division couplers proves especially advantageous, whereby each space-division coupler comprises 32 inputs and 32 outputs. Dependent on the technology employed, the through-connection of signals occurs in only one direction or also occur simultaneously in both direction.

The specific switching matrix network structure, of course, can also be retained given a five-stage or seven-stage structure. The middle switching stage is then, in turn, replaced by a Clos switching matrix network. The plurality of required crosspoints is thereby considerably reduced given a great plurality of inputs.

BRIEF DESCRIPTION OF THE DRAWING

Other objects, features and advantages of the invention, its organization, construction and operation will be best understood from the following detailed description, taken in conjunction with the accompanying drawing, on which:

FIG. 1 is a schematic representation of a switching equipment having a Clos structure; and FIG. 2 is a schematic representation of a switching equipment constructed in accordance with the present invention.

DESCRIPTION OF THE PREFERRED EMBODIMENT

In the switching equipment of FIG. 1, the first switching matrix stage KS1 contains a plurality "x" of n/2n space-division couplers RKL1-RKLx to whose inputs respectively n lines are connected via an interface module SST. Respectively, n lines of a total of nx lines are combined to form line ports LP1-LPx. The interface module serves for the electrical matching of the signals to be through-connected; in addition, it also may contain further equipment for a TDM operation. The outputs of the n/2n space-division couplers are canonically wired, as is standard, to inputs of "2n" x/x space-division couplers via intermediate lines. The outputs of the x/x space-division couplers are, in turn, canonically connected to the inputs of 2n/n space-division couplers RKR1-RKRx of the third switching matrix stage KS3 whose outputs are connected via interface modules SST to line ports RP1-RPx, each of which again comprises n terminals. It is hereby assumed that signals are through-connected from left to right. Consequently, the left-hand terminal of the space-division couplers are referred to as inputs and the right-hand terminals are referred to as outputs. Given switching equipment that through-connect signals in only one direction, this designation coincides with the direction of the message flow. The illustrated switching equipment is then required for each transmission direction.

However, switching equipment are also conceivable in which the message flow occurs in both directions via the same cross points. The designation inputs and outputs for the space-division couplers are then only to be understood as a positional designation for the terminals and the data flow can occur from the output of the 2n/n space-division couplers via the terminals referred to as inputs, the x/x space-division couplers and the n/2n space-division couplers. Of course, interface modules that are likewise correspondingly modified are required for this purpose. The switching equipment illustrated in FIG. 1 differs from an optimum close switching matrix network in that the n/2n space-division couplers comprise one more output and the 2n/n space-division couplers comprise one more input. One more x/x space-division coupler is thereby also required. However, advantages in the control of the appertaining switching computer frequently derive as a result. Fundamentally, however, space-division couplers corresponding to the Clos switching matrix network can also be employed. Given switching equipment having a great plurality of central office lines, involved wiring fields having individual lines that cross one another occur to the necessary canonic wiring between the space-division couplers.

FIG. 2 illustrates a switching equipment wherein respectively one interface module SST and one n/2n space-division coupler are combined to form an interface unit SEL1-SELx. The interface units SEL1-SELx form the first switching matrix stage. For reasons of surveyability, only the first and last interface units are shown. The central office lines conducted to the first switching matrix stage are referenced L1-L(xn).

The middle switching matrix stage is composed of switching matrices KE1-KEy. Each switching matrix is composed of "m" x/x space-division couplers.

Each switching matrix KE1-KEy comprises "x" coupler input ports each of which has respectively m terminals. The first coupler input port E11 is connected to each first input of the x/x space-division couplers RK11-RK1m. The outputs of the x/x space-division couplers are connected to the output ports A11-A1x in the same manner. The outputs of the first interface unit EL1 are likewise combined into interface output ports L11-L1y. The other interface units are identically constructed.

In the third switching matrix stage, the 2n/n space-division couplers are combined with the corresponding interface modules to likewise form interface units SER1-SERx. Here, also, the inputs are respectively combined into data ports having respectively n terminals at the first interface unit SE1R R11-R1y. The central office lines are correspondingly referenced R1-R(xn). The wiring between the interface units and the switching matrices occurs with bus lines that are advantageously constructed as pluggable cables. The first interface output port L11 is therefore connected to the first coupler input port E11, the second interface output port L12 is connected to the first coupler input port of the second switching matrix KE2 (not shown) and the last interface output port L1y of the first interface unit SEL1 is connected to the first coupler input port Ey1 of the last switching equipment input port Eyx. In the same manner, the interface output ports of the second interface device are connected to respectively each second coupler input port and the interface output ports Lx1-Lxy of the last interface unit SELx are connected to all last coupler input ports E1x-Eyx of the switching matrices KE1-KEy. The coupler output ports A11-A1x of the first switching matrix KE1 are connected in the same manner to all first interface input ports R11-Rx1 of the interface unit SER1-SERx of the third switching matrix stage. Correspondingly, coupler output ports of the further switching matrices are respectively connected to all second, third, etc., interface input ports. The allocation between interface outputs and the coupler input ports as well as between the coupler output ports and the interface input ports, of course, are fundamentally arbitrarily interchangeable; a systematic arrangement, of course, facilitates the formatting and control of the switching equipment. The switching equipment has the job of optionally connecting input lines L1-L(x1) that are applied at the input ports LP1-LPx of the interface units SEL1-SELx to the output lines R1-R(xn). The lines can thereby be constructed as two-wire lines. As a rule, only a single-pole through-connection occurs on the basis of the space-division couplers. The signals are initially converted in the interface modules. Due to the n/2n space-division couplers RKL, each input line can be connected to two of its outputs, of which, ultimately, one is through-connected via the switching matrices KE-1-KEy and the interface units SER1-SERx (to the desired output line R1-R(xn)). The outputs of a 2n/n space-division coupler or, respectively, those of the following interface module, form an output port RP1-RPx. All switching matrices have been identically constructed. Of course, it is also possible, given the employment of the original Clos switching matrix network to forego, for example, the last x/x space-division coupler RKym without disadvantages and to likewise forego a respective intermediate line in an interface unit or, respectively, to not execute the corresponding wiring. The designation for the n/2n space division couplers and for the 2n/n space-division couplers here likewise contains space-division couplers that comprise one less output or, respectively, one less input. The described structure, however, was selected for reasons of uniform structure and because of the possibility of transmitting test signals.

It is advantageous to construct all space-division couplers of the x/x couplers to comprise 32 inputs and 32 outputs. The plurality of eight lines has proven itself for the connecting cable when the signals are transmitted in two-wire fashion. The relationship between the plurality of inputs lines per interface unit, the plurality of interface output ports and the plurality of switching matrices is established by the equation $$y \cdot m = 2n.$$

The plurality of inputs and outputs of the x/x space-division couplers corresponds to the plurality of interface units of a switching matrix stage.

Since it is not yet presently possible to integrate x/x space-division couplers having a greater plurality of inputs and outputs, space-division couplers having a greater plurality of inputs and outputs are created by "squaring". For example, a doubling of the inputs and outputs is achieved in that four x/x space-division couplers are interconnected in pairs in that the outputs of respectively one pair are connected in parallel and the inputs of each pair corresponding to one another are connected in parallel. It is thereby possible, on the basis of the control, to connect all inputs to all outputs, whereby, of course, the respective output that is connected parallel must be open or, respectively, reflect a high impedance. The same effect can be achieved by parallel connection of the inputs of a pair of space-division couplers and crossing out the outputs.

Five or more stage Clos switching matrix networks can be employed for switching matrix networks having a greater plurality of inputs. The middle portion thereby corresponds to the arrangement illustrated in FIG. 2 that is supplemented by two further switching matrix stages having n/n space-division couplers to which the input or, respectively, output lines are connected. The expense increases approximately linearly with the plurality of input and output lines given this structure.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A multi-stage switching apparatus for non-blocking connection of nx input lines to nx output lines comprising:

a first switching network stage, an intermediate second switching network stage and a third switching network stage; said first switching network stage comprises n/2n-space-division couplers connected to the nx input lines, said intermediate second switching network stage comprises x/x-space-division couplers, and said third switching network stage comprises 2n/n-space-division couplers connected to the nx output lines;

interface output ports provided by combining outputs of the n/2n-space-division couplers, each of y interface output ports comprising m outputs of the 2n outputs of a respective n/2n-space division coupler;

switching matrices provided by combining x/x-space-division couplers, each of said switching matrices comprising m x/x-space-division couplers;

coupler input ports provided by combining each respective input of the m x/x-space-division couplers of a switching matrix;

coupler output ports provided by combining each respective output of the m x/x-space-division couplers of a switching matrix;

interface input ports provided by combining inputs of the 2n/n-space-division couplers, each of y interface input ports comprising m inputs of the 2n inputs of a respective n/2n-space-division coupler; and interconnecting cables with m interconnecting lines to connect each of said coupler input ports of each switching matrix to a respective interface output port of the n/2n-space-division couplers and to connect each of said coupler output ports of each switching matrix to a respective interface input port of the 2n/n-space-division couplers.

2. The improved multi-stage switching apparatus of claim 1, and further comprising:

a first plurality of interface modules each connected to a respective n/2n space-division coupler to form an interface unit; and a second plurality of interface modules each connected to a respective 2n/n space-division coupler to form an interface unit, said interface modules providing matching between the signals on said input lines and said output lines.

3. The improved multi-stage switching apparatus of claim 1, wherein:

the number of x/x space-division couplers is squared with respect to the space-division couplers having a greater number of inputs and the space-division couplers having a greater number of outputs.

4. The improved multi-stage switching equipment of claim 1, wherein:

said x/x space-division couplers comprises 32 inputs and 32 outputs.

5. The improved multi-stage switching apparatus of claim 1, wherein:

each of said x/x space-division couplers comprises 64 inputs and 64 outputs.

6. The improved multi-stage switching apparatus of claim 1, wherein:

each of said x/x space-division couplers comprises 128 inputs and 128 outputs.

7. The improved multi-stage switching apparatus of claim 1, wherein:

each of said cables is provided with plug mechanisms for its connections.

8. The apparatus according to claim 1 wherein each m interconnecting lines connecting two ports are combined to form a bus.

* * * * *